US008432636B2

(12) United States Patent
Brand

(10) Patent No.: US 8,432,636 B2
(45) Date of Patent: Apr. 30, 2013

(54) DATA STORAGE HEATER SYSTEMS WITH DIODES

(75) Inventor: John L. Brand, Burnsville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/421,507

(22) Filed: Mar. 15, 2012

(65) Prior Publication Data

US 2012/0176873 A1 Jul. 12, 2012

Related U.S. Application Data

(63) Continuation of application No. 12/503,305, filed on Jul. 15, 2009, now Pat. No. 8,159,780.

(51) Int. Cl.
*G11B 5/127* (2006.01)

(52) U.S. Cl.
USPC .................................................. 360/125.02

(58) Field of Classification Search ............ 360/125.02, 360/125.3, 125.39, 123.03, 123.06, 122, 360/125.12
See application file for complete search history.

(56) References Cited

U.S. PATENT DOCUMENTS

| 3,119,095 A | | 1/1964 | Hansen | |
|---|---|---|---|---|
| 3,967,137 A | * | 6/1976 | Reiter | 327/80 |
| 5,117,072 A | * | 5/1992 | White | 191/39 |
| 5,377,172 A | * | 12/1994 | Hino et al. | 369/13.22 |
| 5,498,939 A | * | 3/1996 | Fukuma et al. | 315/370 |
| 6,493,183 B1 | | 12/2002 | Kasiraj et al. | |
| 6,502,955 B2 | * | 1/2003 | Ko | 362/219 |
| 6,975,472 B2 | | 12/2005 | Stover et al. | |
| 7,161,772 B2 | * | 1/2007 | Iben | 360/323 |
| 7,190,543 B2 | | 3/2007 | Suk | |
| 7,911,745 B2 | * | 3/2011 | Antoku et al. | 360/324.12 |
| 8,159,780 B2 | * | 4/2012 | Brand | 360/125.02 |
| 8,233,231 B2 | * | 7/2012 | Thompson et al. | 360/92.1 |
| 8,239,059 B2 | * | 8/2012 | Thompson et al. | 700/214 |
| 2002/0163768 A1 | * | 11/2002 | Kwon et al. | 361/56 |
| 2005/0105220 A1 | * | 5/2005 | Iben | 360/323 |
| 2007/0035881 A1 | | 2/2007 | Burbank et al. | |
| 2007/0206306 A1 | | 9/2007 | Hokuto | |
| 2008/0204914 A1 | | 8/2008 | Hashizume | |
| 2008/0213250 A1 | | 9/2008 | Hopf et al. | |
| 2011/0013316 A1 | | 1/2011 | Brand | |
| 2012/0176873 A1 | * | 7/2012 | Brand | 369/13.02 |

FOREIGN PATENT DOCUMENTS

JP 07210803 8/1995

\* cited by examiner

*Primary Examiner* — Allen T Cao
(74) *Attorney, Agent, or Firm* — Alan G. Rego; Westman, Champlin & Kelly, P.A.

(57) ABSTRACT

An aspect of the disclosure relates to data storage heater systems with diodes. In one embodiment, data storage systems include a first electrical connection point, a second electrical connection point, a first electrical branch, and a second electrical branch. The first electrical branch is connected to the first and the second electrical connection points. The first electrical branch has first and second diodes biased in a first direction. The second electrical branch is connected to the first and second electrical connection points. The second electrical branch has third and fourth diodes biased in a second direction.

21 Claims, 9 Drawing Sheets

DATA STORAGE HEATER SYSTEMS WITH DIODES

REFERENCE TO RELATED CASE

The present application is a continuation application that is based on and claims the priority of non-provisional application Ser. No. 12/503,305 filed on Jul. 15, 2009, the contents of which are hereby incorporated by reference in their entirety.

BACKGROUND

Data storage systems commonly have a recording head that reads information from a recording medium and that writes information to a recording medium. Recording heads may also have other electrical components such as a heater. Recording head heaters may be used to actuate another recording head component such as a read transducer or a write transducer.

Recording heads do not have internal power supplies to enable their electrical components to function. Instead, they rely on external power sources that are electrically connected to electrical connection points located on or within the bodies of the recording heads.

SUMMARY

An aspect of the disclosure relates to data storage heater systems with diodes. In one embodiment, data storage systems include a first electrical connection point, a second electrical connection point, a first electrical branch, and a second electrical branch. The first electrical branch is connected to the first and the second electrical connection points. The first electrical branch has first and second diodes biased in a first direction. The second electrical branch is connected to the first and second electrical connection points. The second electrical branch has third and fourth diodes biased in a second direction.

These and various other features and advantages that characterize the claimed embodiments will become apparent upon reading the following detailed description and upon reviewing the associated drawings.

BRIEF DESCRIPTIONS OF THE DRAWINGS

DETAILED DESCRIPTION

In one embodiment of the present disclosure, recording heads have dual heaters that receive power from an external source through two electrical connection points. Previous recording heads have commonly used three electrical connection points to receive power for dual heaters. Due to the limited space on recording heads for electrical connection points, it is desirable to have as few of them as possible. Additionally, certain embodiments of the present disclosure include methods and devices that operate recording head heaters with improved electrical characteristics. For example, in one embodiment, heaters are operated such that the voltage across each heater is the same or more similar to the voltage of other recording head components such as a write transducer or a read transducer. Also for example, in an embodiment, the centers of the heaters are at or approximately at zero volts when they are operated. These illustrative electrical characteristics are advantageous for many reasons. For instance, if a heater is separated from a write transducer by a dielectric layer, and the heater is at a higher voltage than the write transducer, this voltage difference across the dielectric layer may cause an electrical break down of the dielectric layer. Also for instance, a read transducer may be adversely affected by a heater. If a heater generates too large of a voltage near the read transducer, the operation of the transducer may be interfered with or the materials in the transducer may be damaged.

FIGS. 1, 2, 3, and 4 are illustrative operating environments in which certain embodiments disclosed herein may be incorporated. The operating environments shown in the figures are for illustration purposes only. Embodiments of the present disclosure are not limited to any particular operating environment such as those shown in FIGS. 1, 2, 3, and 4. Embodiments of the present disclosure are illustratively practiced within any number of different types of operating environments.

Figure 1:
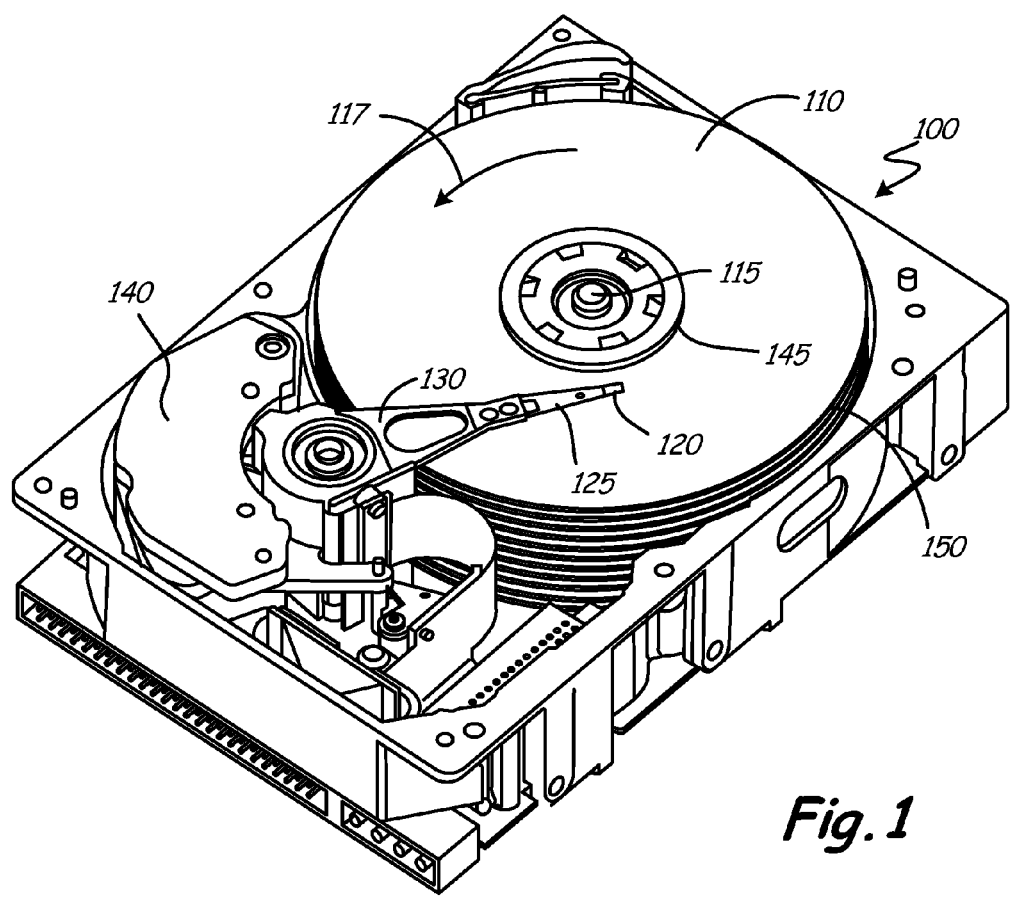
FIG. 1 is a perspective view of a data storage system.

FIG. 1 is a perspective view of a hard disc drive 100. Hard disc drives are a common type of data storage system. While embodiments of this disclosure are described in terms of disc drives, other types of data storage systems should be considered within the scope of the present disclosure.

Disc drive 100 includes a magnetic disc or recording medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arcuate path between a disc inner diameter 145 and a disc outer diameter 150.

Figure 2:
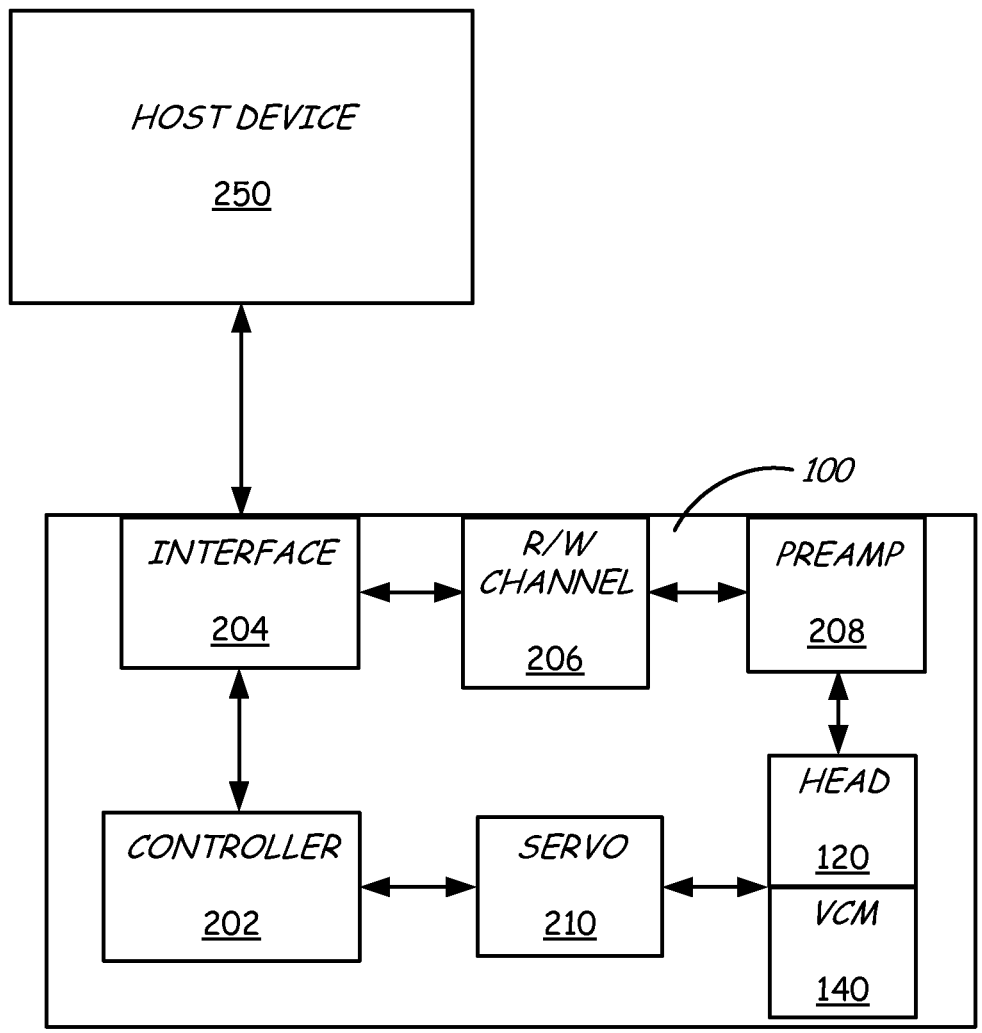
FIG. 2 is a generalized functional block diagram of a data storage system.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a recording medium such medium 110 in FIG. 1. Preamp 208 also optionally acts as a power supply to electrical components included in a recording head such as a read transducer, a write transducer, heaters, etc. Preamp 208 is illustratively electrically connected to recording head 120 through an HGA circuit that is connected to preamp 208 and to one or more recording head 120 electrical connection points. A servo circuit 210 provides closed loop positional control for voice coil motor 140 that positions recording head 120.

Figure 3:
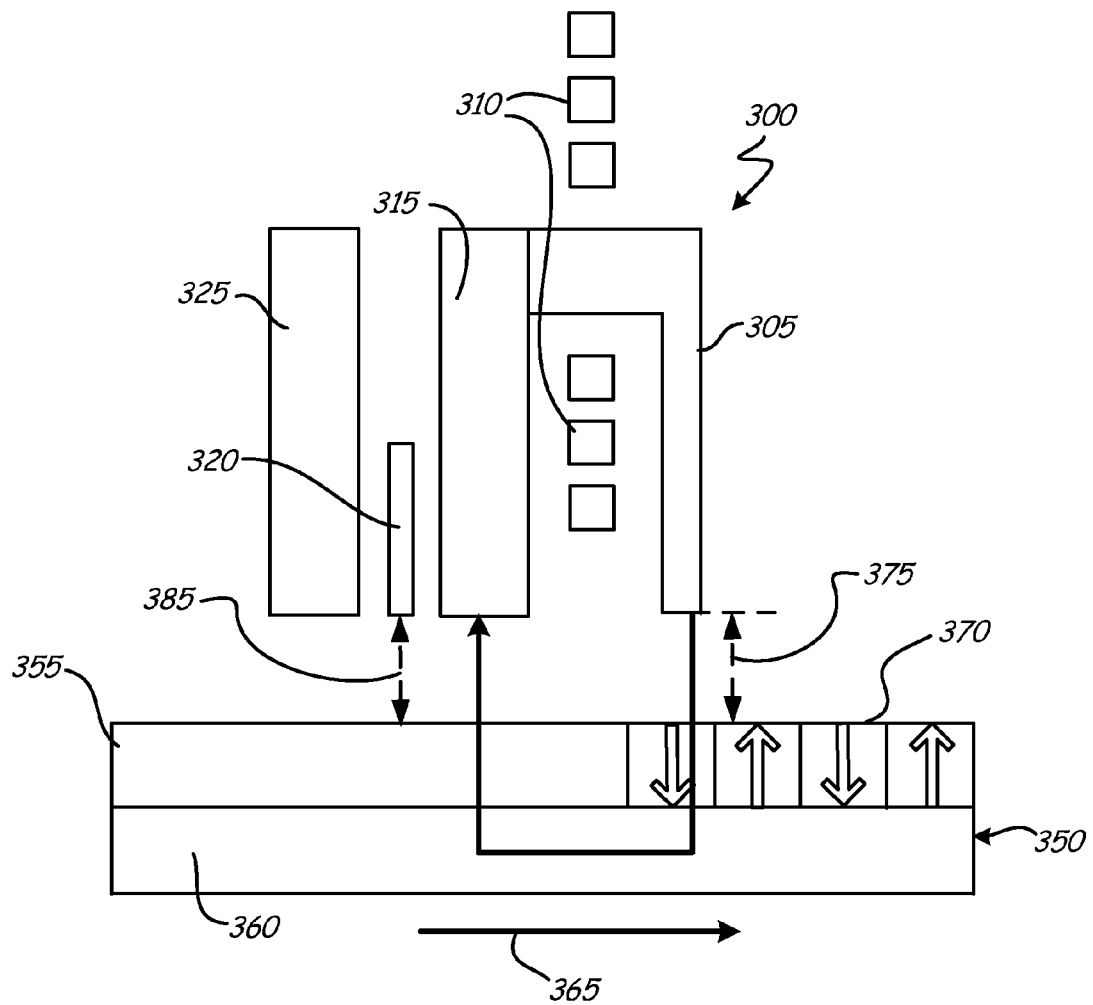
FIG. 3 is a schematic diagram of a cross-section of a recording head writing to a storage medium.

FIG. 3 is a schematic diagram showing a cross-sectional view of portions of a recording head 300 and a recording medium 350. The recording head elements shown in FIG. 3 are illustratively included in a recording head such as recording head 120 in FIGS. 1 and 2. Medium 350 is illustratively a recording medium such as medium 110 in FIG. 1. Those skilled in the art will recognize that recording heads and recording media commonly include other components. Embodiments of the present disclosure are not limited to any particular recording heads or media. Embodiments of the present disclosure are practiced in all types of recording heads and media.

Recording head 300 includes a write pole 305, a magnetization coil 310, a return pole 315, a read transducer 320, and a bottom shield 325. Storage medium 350 includes a recording layer 355 and an underlayer 360. Storage medium 350 rotates in the direction shown by arrow 365. Arrow 365 is illustratively a direction of rotation such as arrow 117 in FIG. 1.

In an embodiment, electric current is passed through coil 310 to generate a magnetic field. The magnetic field passes from write pole 305, through recording layer 355, into underlayer 360, and across to return pole 315. The magnetic field illustratively records a magnetization pattern 370 in recording layer 355. Read transducer 320 senses or detects magnetization patterns in recording layer 355, and is used in retrieving information previously recorded to layer 355.

FIG. 3 includes a spacing 375 that represents the spacing or distance between write pole 305 and the surface of storage medium 350. Spacing 375 is one factor that determines the strength of a magnetic field on the storage medium. As spacing 375 increases, the strength of the magnetic field decreases. If spacing 275 is too great, the magnetic field may be too weak to write efficiently.

FIG. 3 also includes a spacing 385 that represents the spacing or distance between read transducer 320 and the surface of storage medium 350. Spacing 385 is one factor that determines the ability of transducer 320 to detect magnetization patterns recorded to medium 350. Transducer 320 is illustratively better able to detect magnetization patterns as spacing 385 decreases.

Figure 4:
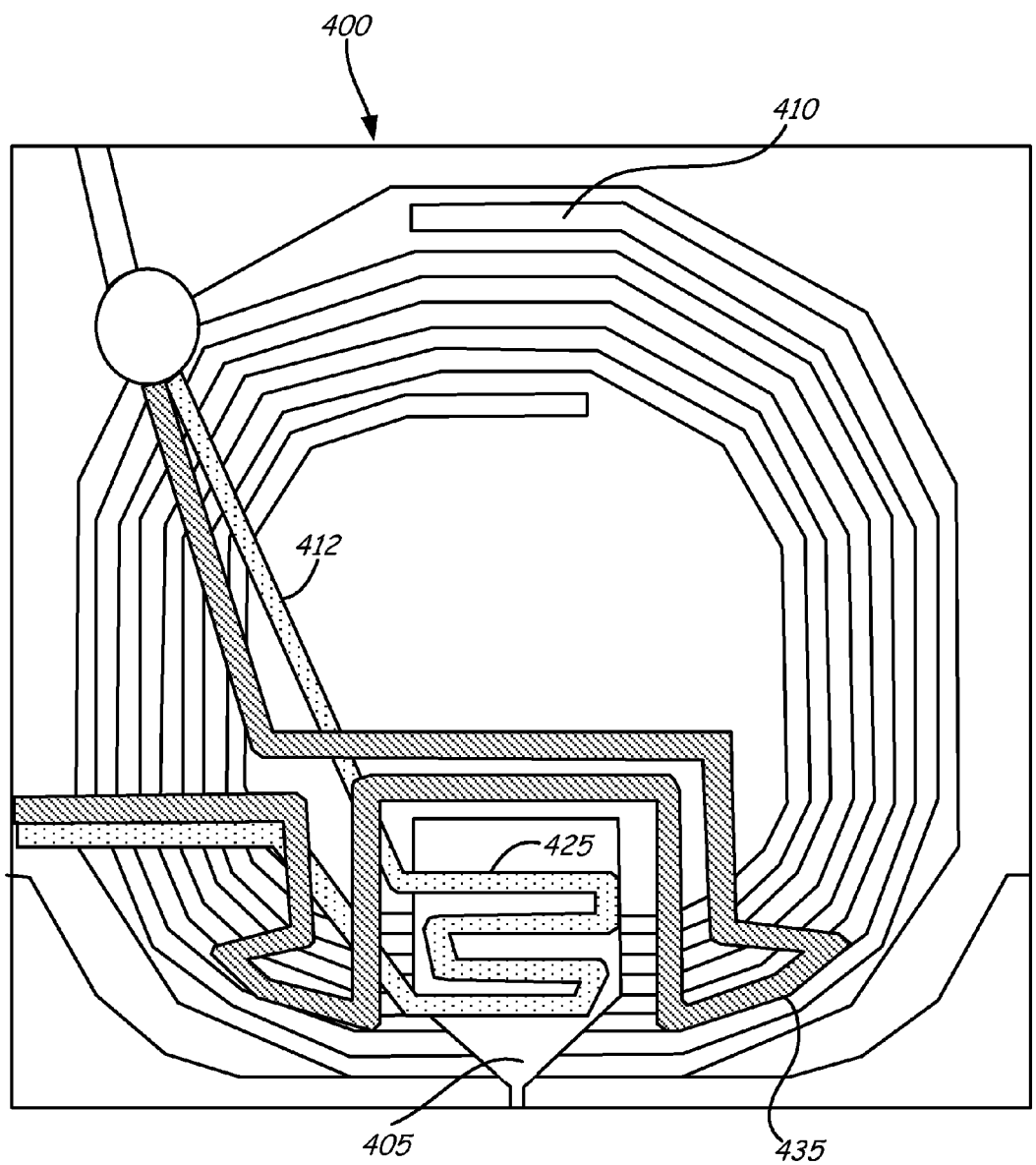
FIG. 4 is a schematic diagram of a recording head having a first and a second heater.

FIG. 4 is a top down schematic diagram of a portion of a dual heater recording head 400. Head 400 includes a magnetization coil 410 that is illustratively a magnetization coil such as coil 310 in FIG. 3, and a write pole 405 that is illustratively a write pole such as pole 305 in FIG. 3. Head 400 also includes a first heater 425 and a second heater 435. Heaters 425 and 435 are illustratively electrically resistive heaters that generate thermal energy as an electric current passes through them. As can be seen in the figure, heater 425 is positioned or located proximate to write pole 405. Accordingly, as current passes through heater 425, it generates thermal energy that is transferred to the write transducer. This causes the write transducer to thermally expand which in return reduces the spacing between the write transducer and a recording medium (e.g. it decreases spacing 375 in FIG. 3).

Second heater 435 is positioned or located away from write pole 405. In an embodiment, heater 435 is positioned or located proximate to a read transducer such that thermal energy from heater 435 is transferred to the read transducer. This causes the read transducer or an area that includes the read transducer to thermally expand, which in turn decreases the spacing between the read transducer and a recording medium (e.g. it decreases spacing 385 in FIG. 3).

As was previously mentioned, FIGS. 1, 2, 3, and 4 are only illustrative operating environments in which some embodiments of the present disclosure may be incorporated. Embodiments are not limited to the specific recording heads, read transducers, write transducers, storage devices, control circuitry, or heaters shown in the figures. Embodiments are incorporated in environments that include any recording head, read transducer, write transducer, storage device, control circuitry, or heater.

Figure 5:
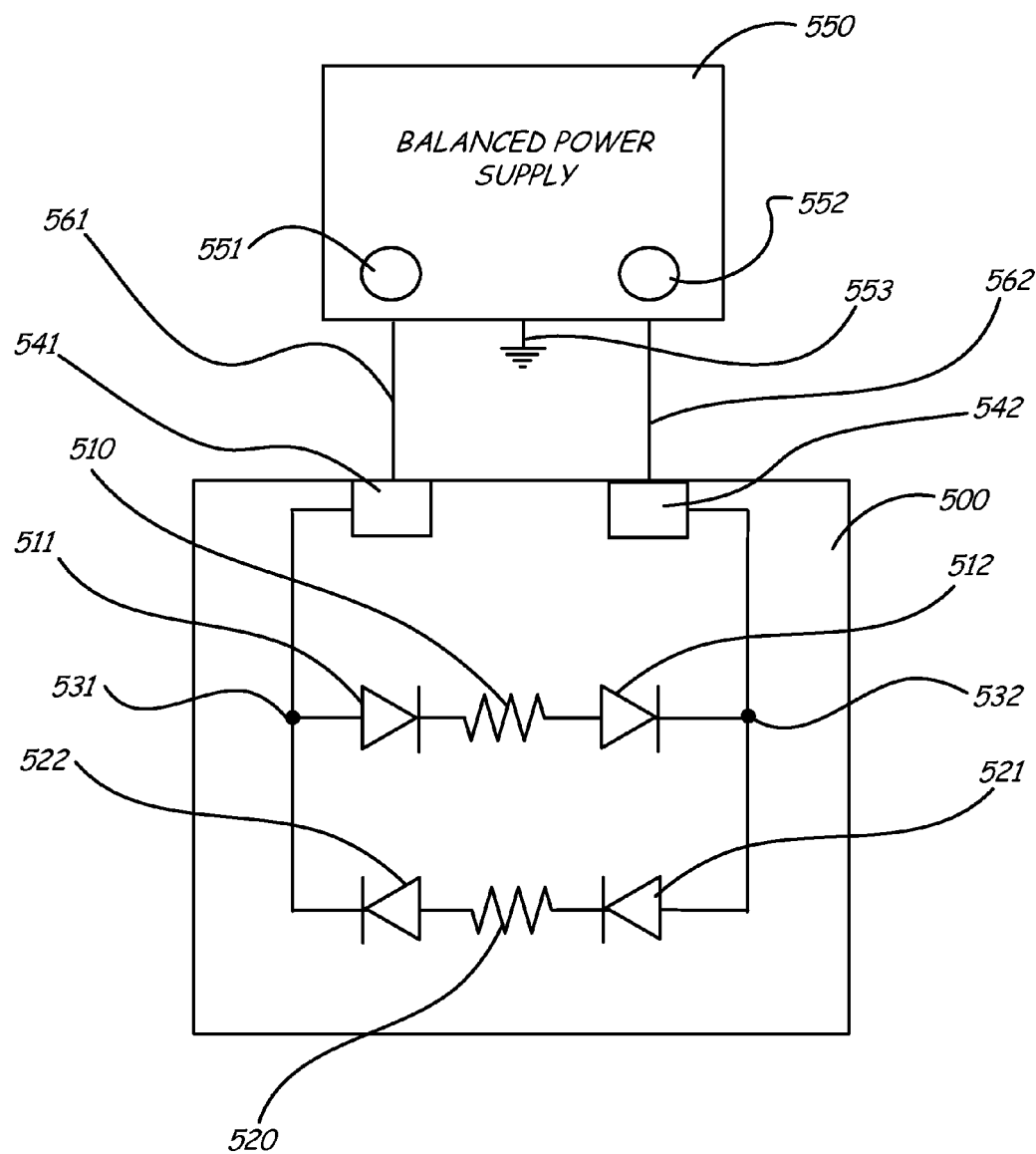
FIG. 5 is a schematic diagram of a four diode recording head dual heater system.

FIG. 5 is schematic diagram of one embodiment of a recording head heater system according to the present disclosure. FIG. 5 includes a recording head 500 electrically connected to a balanced power supply component 550 through a first electrical trace 561 and a second electrical trace 562. Power supply component 550 is illustratively a preamp or other electrical component in a data storage system, and traces 561 and 562 are illustratively included in an HGA circuit. It should be noted that recording head 500 is shown to only include components associated with a heater system. Embodiments of head 500 include other components such as, but not limited to, read transducers, write transducers, air bearing surfaces, and additional electrical connection points. Head 500 is presented in simplified form to highlight features of the heater system.

Head 500 includes a first heater 510 and a second heater 520. Heaters 510 and 520 are illustratively resistive heating elements that generate thermal energy as a current passes through them. In an embodiment, heaters 510 and 520 are positioned or formed such that they transfer thermal energy to different portions or features of head 500. For example, in one embodiment, heater 510 is configured such that it transfers thermal energy to a write transducer, and heater 520 is configured such that it transfers thermal energy to a read transducer. Embodiments of the present disclosure are not however limited to any particular configurations of heaters.

First heater 510 and second heater 520 share two electrical connection points that are within head 500, a first electrical connection point 531 and a second electrical connection point 532. Heater 510 is on a first electrical path or leg between points 531 and 532 (i.e. the path between points 531 and 532 that passes through heater 510), and heater 520 is on a second electrical path or leg between points 531 and 532 (i.e. the path between points 531 and 532 that passes through heater 520). As is shown in the figure, the first and second paths or legs are illustratively electrically parallel.

Each path between points 531 and 532 includes two diodes that are electrically connected in series to the heaters. Heater 510 has a first diode 511 on one side and a second diode 512 on its other side. Heater 520 has a first diode 521 on one side and a second diode 522 on its other side. Each diode has a unidirectional electric property. The diodes allow a current to flow in one direction (i.e. the forward biased condition) and block current flow in the opposite direction (i.e. the reverse biased condition). The two diodes in each path are illustratively biased in the same direction (e.g. diodes 511 and 512 have the same bias, and diodes 521 and 522 have the same bias), and the diodes in the two paths are illustratively biased in opposite directions (e.g. diodes 511 and 512 are biased in the opposite direction from diodes 521 and 522).

Each diode has an associated "cut in" voltage and voltage drop across the diode. For example, for a diode having a "cut in" voltage of 0.6 volts, a voltage of 0.6 volts or greater (in the correct polarity) is needed for current to flow through the diode, and the diode will have a voltage drop across the diode of 0.6 volts. In one embodiment, diodes 511, 512, 521, and 522 have the same or approximately the same characteristics (e.g. the same "cut in" voltages). In another embodiment the diodes in each path have the same characteristics, but have different characteristics from the diodes in the other path (e.g. diodes 511 and 512 have the same "cut in" voltage, and diodes 521 and 522 have the same "cut in" voltage which is different than that of diodes 511 and 512). Embodiments of diodes are not however limited to any particular diode characteristics, types of diodes, or configurations of diodes. Embodiments include diodes of any type, with any characteristics, and with any configuration.

Electrical connection point 531 is electrically connected within the recording head to a first recording head external connection point 541, and electrical connection point 532 is electrically connected within the recording head to a second recording head external connection point 542. Points 541 and 542 are illustratively on or within the recording head, and are configured such that they facilitate or enable an external device such as, but not limited to, an HGA circuit and/or a preamp to electrically connect to the recording head. In an embodiment, points 541 and 542 are bond pads that have surfaces that enable an HGA circuit to be soldered to or otherwise attached to the recording head. Embodiments of points 541 and 542 are not however limited to any particular configuration.

Power supply component 550 includes a first terminal 551, a second terminal 552, and a ground reference 553. Component 550 is illustratively a balanced power supply component in that the voltages on terminals 551 and 552 have the same magnitude, but opposite polarities. Component 550 is illustratively able to generate any magnitude of voltages and is able to switch the polarities of the terminals. For example, for illustration purposes only and not by limitation, supply 550 is able to switch between terminal 551 having a voltage of +1.1 volts and terminal 552 having a voltage of -1.1 volts, and terminal 551 having a voltage of -1.1 volts and terminal 552 having a voltage of +1.1 volts.

The heater system of FIG. 5 has several different operational modes. In one mode, no voltage is supplied at either terminal 551 or 552. In this case, no electrical current flows through either heater 510 or heater 520. This mode can be useful in many settings. For example, the spacing between a recording head transducer and a recording medium generally decreases with reduced pressure (e.g. at higher elevations). In such a situation, it may not be necessary to thermally expand any of the components of a recording head. Also for example, it may be useful to intermittently turn the heaters on and off to establish a steady state or approximately steady state amount of thermal expansion/heating (i.e. as opposed to continuously leaving the heaters on).

In a second mode, terminal 551 has a positive voltage, and terminal 552 has a voltage of the same magnitude as that of terminal 551 but of the opposite polarity (i.e. it has a negative voltage). In an embodiment where the heaters have oppositely biased diodes, the diodes of one of the heaters will be in the forward biased condition. In this case, if the voltage differential between terminals 551 and 552 is equal to or greater than the combined "cut in" voltages for both of the diodes (e.g. diodes 511 and 512), then current will flow through the heater. For example, if terminal 551 has a voltage of +1.1 volts and terminal 552 has a voltage of -1.1 volts, then the voltage differential between the terminals is 2.2 volts. If diodes 511 and 512 are forward biased and the "cut in" voltages for both are 0.6 volts, then the voltage differential of 2.2 volts is greater than the "cut in" voltages of both diodes (i.e. 0.6+0.6=1.2 volts). The result is that current will flow through heater 510 and there will be a voltage drop of 1.0 volts across the heater.

It is worth highlighting a few points about this mode. First, because of the symmetrical or balanced nature of the circuit (i.e. terminals 551 and 552 have the same magnitude of voltage but opposite polarities, and diodes 511 and 512 have the same "cut in" voltage), the point along the circuit that has a ground potential or a voltage of zero volts is in the middle of the heater. Similarly, the ends of the heater (i.e. the parts of the heater closest to diodes 511 and 512) have the same magnitude or approximately same magnitude of voltage but of opposite polarity (e.g. in the example given above, one end of the heater has a voltage of -0.5 volts and the other end has a voltage of +0.5 volts). Additionally, because the voltages at terminals 551 and 552 can be set to provide any voltage differential, the voltage drop across the heater can be set to be any value (e.g. it was set to 1.0 volts in the example above).

These electrical characteristics are advantageous in recording heads. For instance, as was previously mentioned, large voltage differences between electrical components in a recording head can cause dielectric breakdown. Also as was previously mentioned, heaters at a high voltage can interfere or damage other electrical components. In the system of FIG. 5, the center of the heater is at ground potential and is thus not at a high voltage. Additionally, the voltage drop across the heater can be set to any value. Accordingly, it is illustratively set to be the same or approximately the same as other components in a recording head. This reduces or eliminates voltage differentials across a dielectric layer caused by a heater.

In a third mode of operation of the system of FIG. 5, terminal 551 has a negative voltage, and terminal 552 has a voltage of the same magnitude as that of terminal 551 but of the opposite polarity (i.e. it has a positive voltage). This mode is essentially the opposite of the previously described mode. The polarity of the voltage differential across the recording head circuit is the opposite of what it was in the second mode. In this case, the diodes of the heater that were in the forward biased condition in the second mode are now in the reverse biased condition. Accordingly, current will not flow through the heater that received current in the second mode, and the heater will be off (i.e. it will not generate thermal energy). However, the diodes that were previously in the reverse biased condition are now in the forward bias condition. Consequently, current may now flow through the other heater. For example, if diodes 521 and 522 are in the forward biased condition and the voltage differential between terminals 551 and 552 is greater than the combined "cut in" voltages of diodes 521 and 522, then current will flow through the second heater 520. In one embodiment, diodes 521 and 522 have the same "cut in" voltage values. Accordingly, the balanced or symmetrical electrical properties previously discussed in discussing the second mode, also apply to this mode. The difference between the second and third modes is that the heater that was turned on in the second mode is now turned off, and the heater that was turned off in the second mode is now turned on.

In an embodiment, the voltage differentials used to power the first and second heaters are the same. In another embodiment, the voltage differentials used to power the first and second heaters are different. Similarly, the resistances of the heaters are also illustratively either the same or different. The voltage differentials and resistances are optionally chosen to optimize performance of a recording head. For example, a recording head may require two heaters that provide different amounts of thermal energy or that have different voltage drops across the heaters. The voltages and resistance are chosen such that the correct combination of thermal energy and/or voltage drop is provided.

So far, the system of FIG. 5 has only been described in the context of using equal magnitude voltages with opposite polarities to power recording head 500. The recording head 500 circuitry is also illustratively used with any configuration of a power supply component. For example, the circuitry is illustratively used with an unbalanced power supply component (i.e. a component that provides any two different voltages on terminals 551 and 552), a floating power supply (i.e. a component that provides any voltage differential across terminals 551 and 552 without an explicit reference to ground), or an alternating current power supply. Embodiments of recording head 500 are not limited to any particular power supply component or configuration.

Additionally, the system of FIG. 5 has only been discussed in the context of a recording head having two heaters 510 and 520. In an embodiment, recording head 500 only includes one heater. In such a case, the advantageous electrical properties associated with the two heater system (e.g. having a voltage of zero volts at a center of a heater) are also realized in a one heater system. In another embodiment, heaters 510 and 520 are illustratively replaced with any electrical component such as a read transducer or a write transducer. The system of FIG. 5 is not limited to only being used with heaters.

Figure 6:
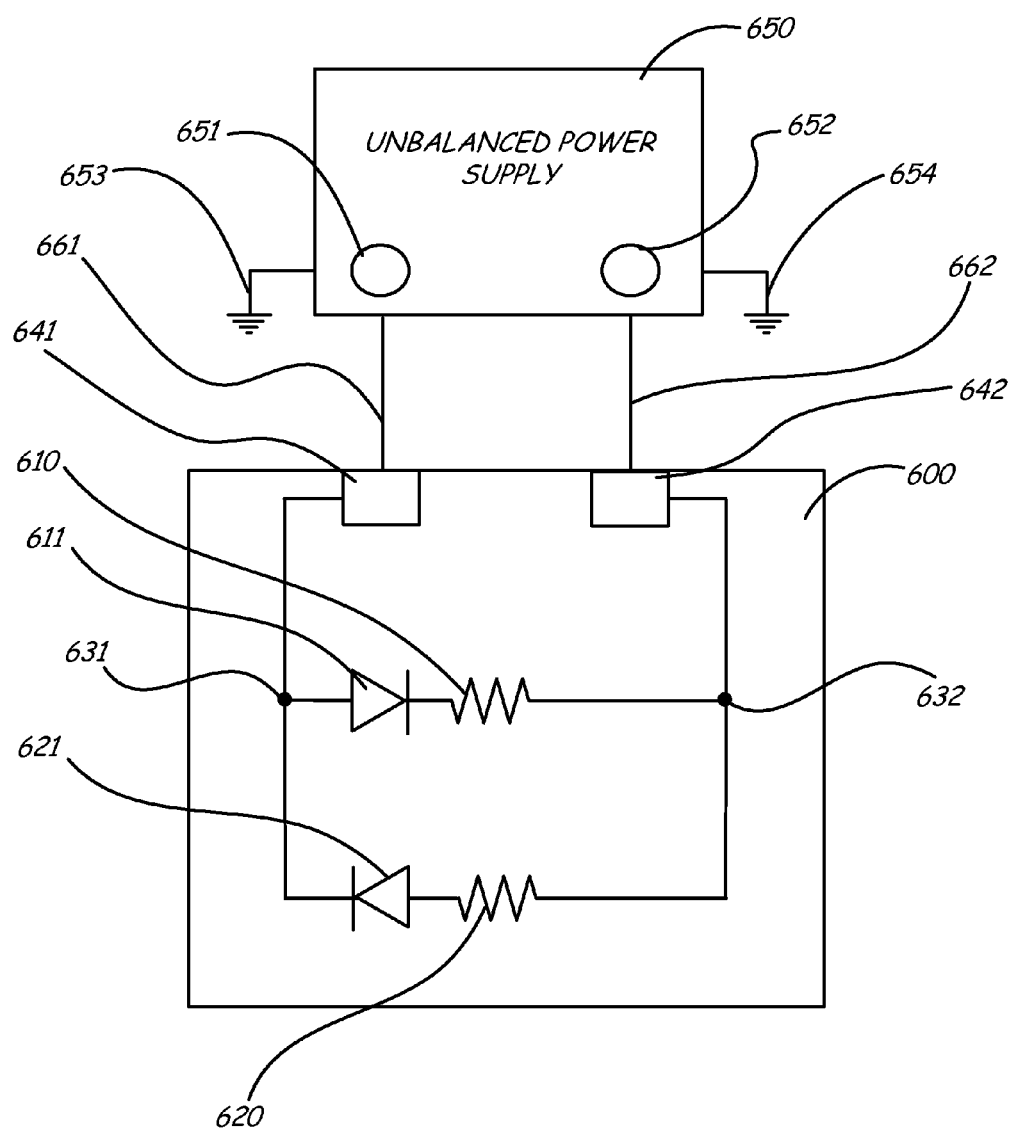
FIG. 6 is a schematic diagram of a two diode recording head dual heater system.

FIG. 6 is a schematic diagram of another embodiment of a recording head heater system. The system in FIG. 6 has many of the same or similar components as the system in FIG. 5, and the FIG. 6 components are numbered accordingly. The main points that will be discussed in reference to FIG. 6 are the differences between it and FIG. 5. In one embodiment, the system of FIG. 6 has an unbalanced power supply 650. Each of the voltages at terminals 651 and 652 has a ground reference (i.e. ground references 653 and 654), and the voltages at the terminals include any values that provide a voltage differential (i.e. the voltages at terminals 651 and 652 are any two unequal voltages). Recording head 600 has two diodes 611 and 621 on electrically parallel paths that also include heaters 610 and 620. Diode 611 is illustratively electrically connected in series to heater 610, and diode 621 is illustratively electrically connected in series to heater 620. The polarity of the voltage differential applied to electrical connection points 641 and 642 is reversed to alternate between which one of the two heaters receives current.

The voltages at terminals 651 and 652 are illustratively chosen such that the centers of the heaters are at zero or ground potential when the heaters are being operated. For example, in one embodiment, terminal 651 has a voltage of +1.1 volts that is applied to electrical connection point 641, and terminal 652 has a voltage of −0.5 volts that is applied to electrical connection point 642. This creates a voltage differential of 1.6 volts across the recording head heater circuit. In an embodiment, diode 611 is oriented such that it is forward biased with this voltage differential and diode 621 is oriented such that it is reversed biased with the voltage differential. Diodes 611 and 621 optionally include any "cut in" voltage. For illustration purposes only and not by limitation, diodes 611 and 612 have "cut in" voltages of 0.6 volts. Accordingly, current flows through heater 610 and no current flows through heater 620. The voltage drop across diode 611 is 0.6 volts and the voltage drop across heater 610 is 1.0 volts.

It is worth noting that in the example given above, that the voltages at the ends of heater 610 are +0.5 volts and −0.5 volts, and that the voltage at the center of the heater is 0 volts, or in other words, at ground potential. These heater voltages and the voltage drop across the heater are the same as the values for the example discussed in connection with the FIG. 5 system. Consequently, the same or similar benefits of having reduced voltages at a heater and reduced voltage differentials between the heaters and other electrical components may be realized for the system of FIG. 5.

Similar to the system of FIG. 5, in the system of FIG. 6, the voltages, voltage differentials, resistances of the heaters, number of heaters, and the "cut in" voltages of the diodes can include any values. The values are illustratively chosen such that the heaters produce an adequate amount of thermal energy and that the heaters have the same or similar voltages as other electrical components in the recording head. The heaters of FIG. 5 are also illustratively replaced by one or more electrical components other than a heater. Also, the system of FIG. 6 has been described in the context of having an unbalanced power supply component with ground references, the system of FIG. 6 optionally includes any type of power supply component that is connected to recording head 600 (e.g. balanced power supply, floating power supply, alternating current, etc.).

Figure 7A:
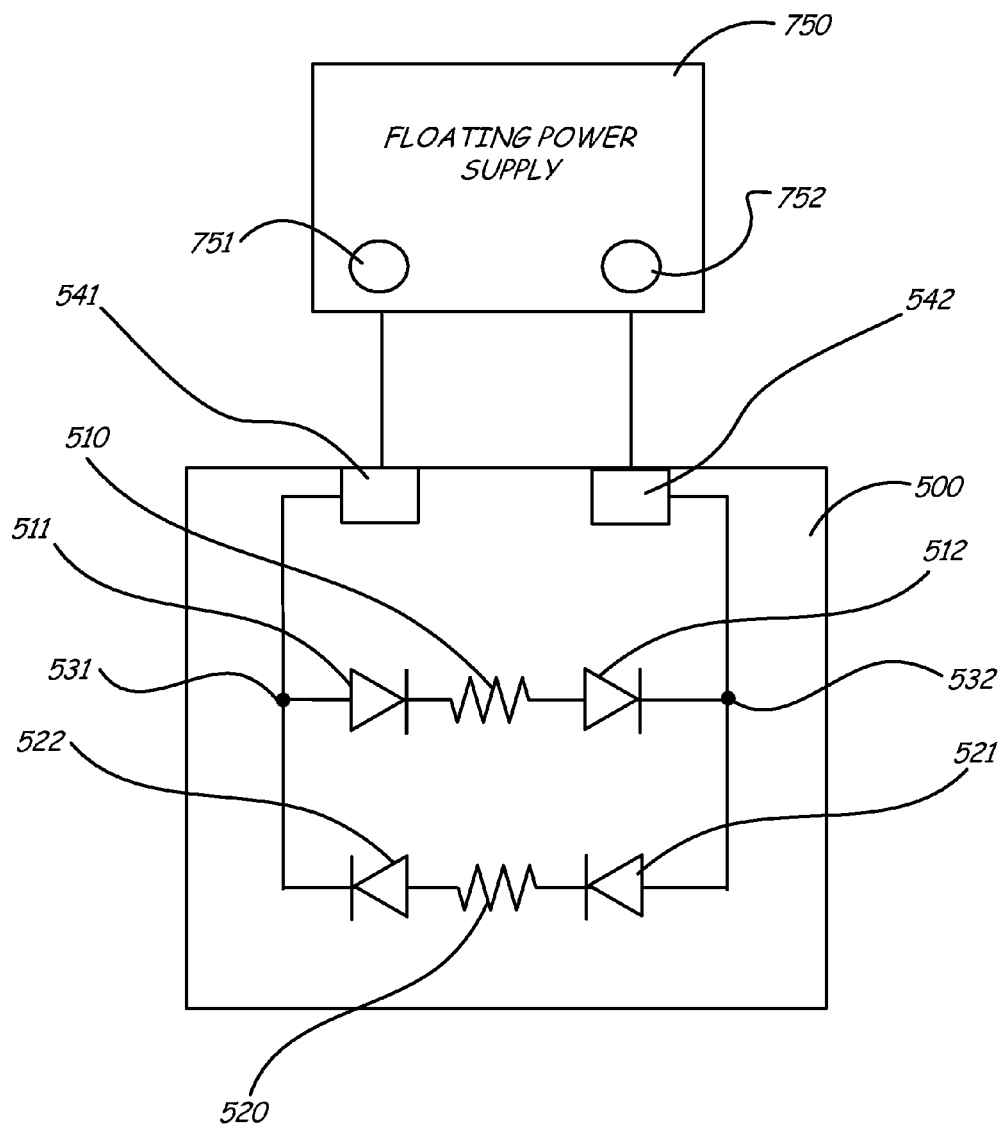
FIG. 7A is a schematic diagram of a four diode dual heater system with an unbalanced power supply.
Figure 7B:
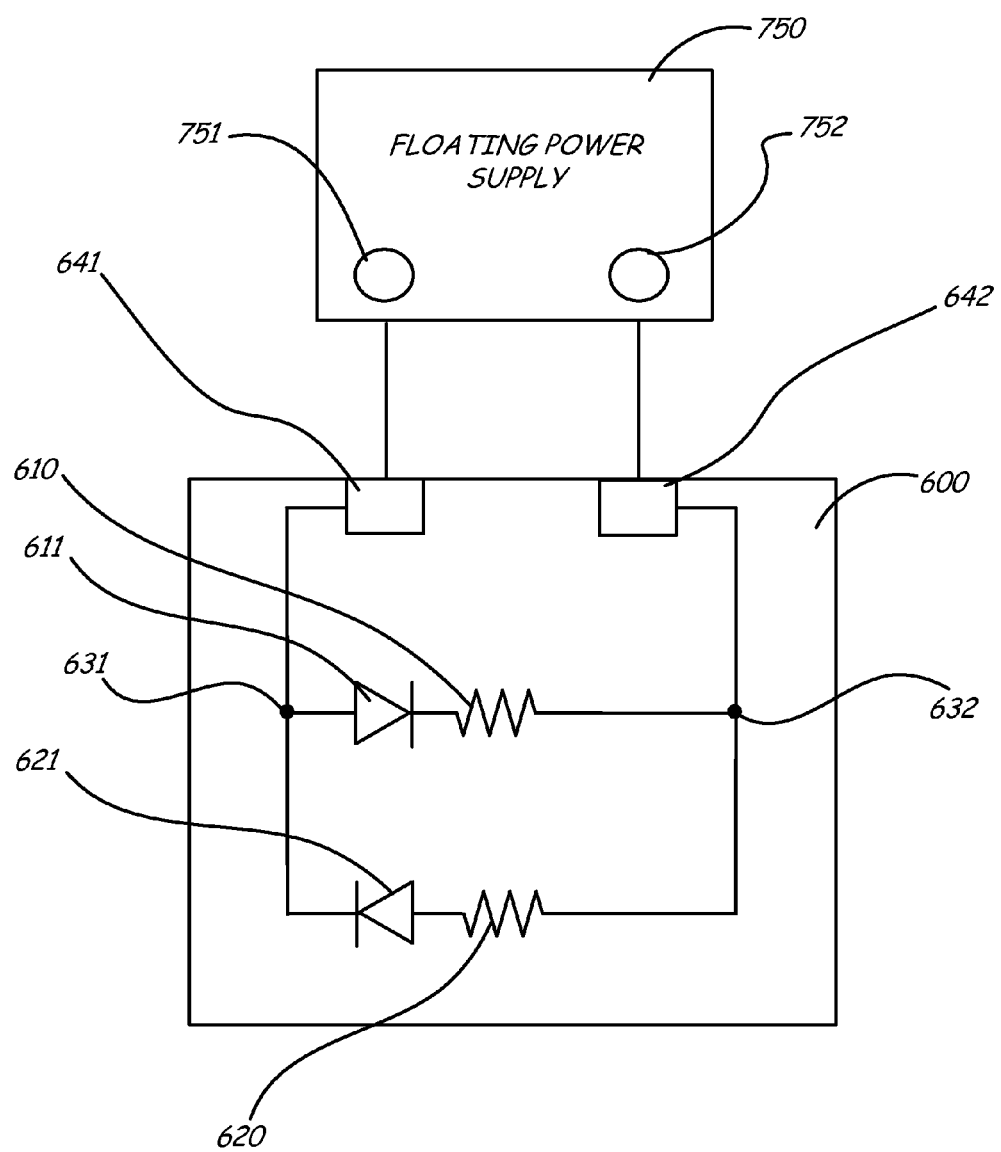
FIG. 7B is a schematic diagram of a two diode dual heater system with an unbalanced power supply.

FIGS. 7A and 7B illustrate systems in which recording head 500 in FIG. 5 and recording head 600 in FIG. 6 are powered using a floating power supply 750. Power supply 750 does not have a reference to ground such as reference 553 in FIG. 5 or references 653 and 654 in FIG. 6. Power supply 750 is illustratively able to generate any voltage differential across terminals 751 and 752 (e.g. +2.2 volts, −2.2 volts, +1.6 volts, −1.6 volts, etc.). Accordingly, power supply 750 is able to control the heater systems such that one heater in the system is selectively turned on and the other is turned off. However, the value of the voltages at terminals 751 and 752 are not known. Consequently, although the voltage drops across the recording head circuit components are known, the values of the voltages at points in the circuit are not known.

The systems shown in FIGS. 7A and 7B provide several advantages. For example, other electrical components in the recording head may be similarly powered by a floating power supply. In such a case, the use of a floating power supply allows for the voltages across the heater systems to be the same or similar to voltages of other recording head components. This reduces voltage differentials between the heaters and other components. The systems in FIGS. 7A and 7B may also be advantageous based on power supply availability and costs.

Figure 8:
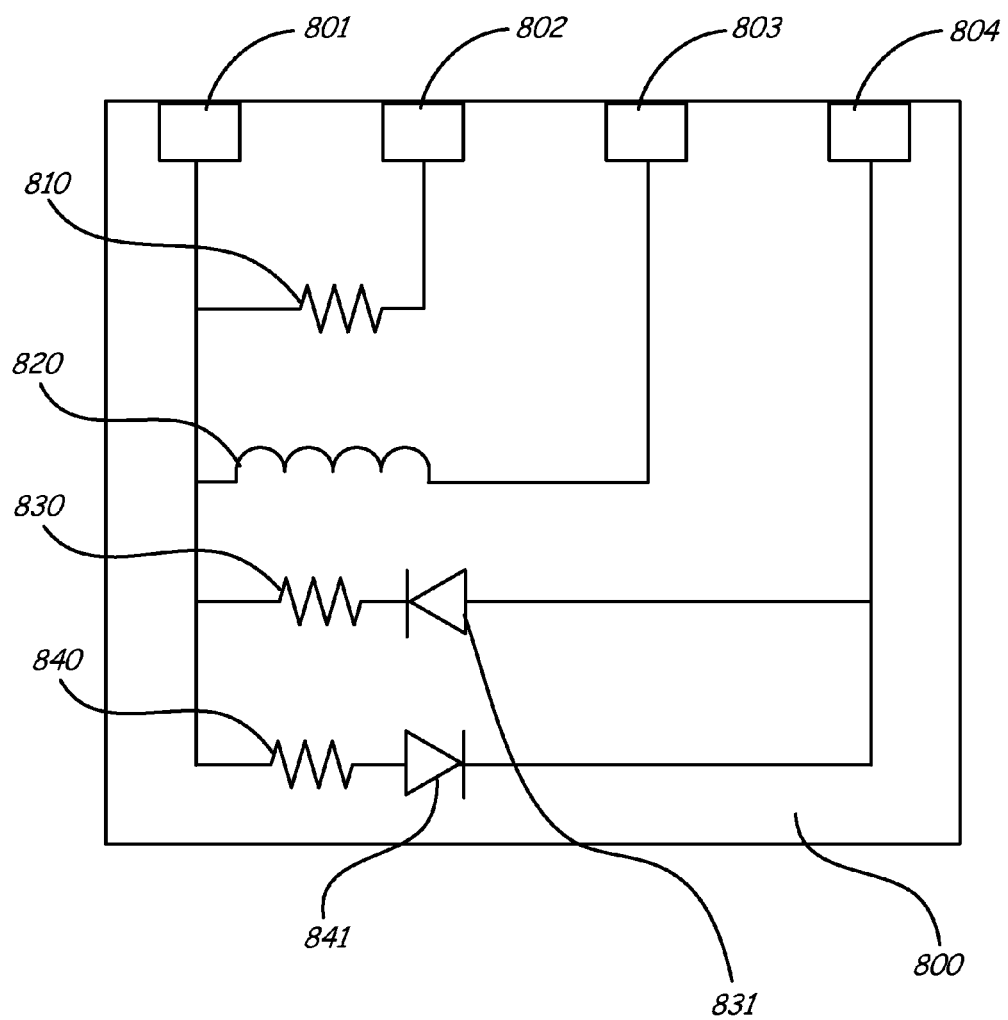
FIG. 8 is a schematic diagram of a recording head that operates four electrical components using four electrical connection points.

FIG. 8 is a schematic diagram of a recording head 800 that operates four electrical components using four recording head electrical connection points, 801, 802, 803, and 804. In an embodiment, the first electrical component 810 is a recording head read transducer, the second electrical component 820 is a recording head write transducer, the third electrical component 830 is a first heater, and the fourth electrical component 840 is a second heater. The four electrical components are each connected to electrical connection point 801. First electrical component 810 is also connected to point 802. Second electrical component 820 is also connected to point 803, and the third electrical component 830 and the fourth electrical component 840 are each also connected to point 804. As is shown in the figure, components 830 and 840 are illustratively electrically parallel. Component 830 is illustratively electrically connected in series to a diode 831, and component 840 is illustratively connected in series to a diode 841. Diodes 831 and 841 are optionally oriented such that they have opposite biases than each other. In an embodiment, components 830 and 840 each has a second diode electrically connected in series such as is shown in FIGS. 5 and 7A (i.e. each component 830 and 840 has two associated diodes).

The electrical components are powered or operated by applying a voltage differential across their associated connection points. For example, current is flown through component 810 by applying a first voltage to point 801 (which may be 0 volts) and a second voltage to point 802 that is different than the first voltage. Current is flown through component 820 by applying a first voltage to point 801 and a second, different voltage to point 803. For components 830 and 840, applying a voltage differential across points 801 and 804 either flows a current through component 830 or component 840. The component that receives a current depends on the polarity of the voltage differential. The component that receives current is switched by reversing the polarity.

Recording head 800 is optionally operated using any type of power supply (e.g. balanced, unbalanced, floating, alternating current, etc.). In one embodiment, for illustration purposes only and not by limitation, the shared electrical connection point 801 is at ground (e.g. floating ground or fixed ground) and voltages are applied to points 802, 803, and 804 to flow current to the components. The polarity of the voltage applied to point 804 is reversed to switch between which of the two electrically parallel components is being operated. In an embodiment, the applied voltages are selected such that the voltage drops across the electrical components are the same or approximately the same.

As can be seen in FIGS. 5, 6, 7A, 7B, and 8, certain embodiments of the present disclosure operate multiple electrical components using a reduced number of recording head electrical connection points. Additionally, certain embodiments are configured such that electrical voltages across recording heads are more balanced, which may reduce harmful effects associated with voltage differentials between electrical components of a recording head (e.g. dielectric breakdown). Additionally, certain embodiments are configured such that they are able to operate using multiple different types of power supplies, which may provide design flexibility and reduce costs.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A recording head comprising:
   a first electrical connection point;
   a second electrical connection point;
   a first electrical path connected to the first and the second electrical connection points, the first electrical path having first and second diodes, within the recording head, biased in a first direction; and
   a second electrical path connected to the first and the second electrical connection points, the second electrical path having third and fourth diodes, within the recording head, biased in a second direction.

2. The recording head of claim 1, wherein the first electrical path includes a first electrical component connected in series to the first and the second diodes.

3. The recording head of claim 2, wherein the second electrical path includes a second electrical component connected in series to the third and the fourth diodes.

4. The recording head of claim 3, wherein the first electrical component is located between the first and the second diodes, and the second electrical component is located between the third and the fourth diodes.

5. The recording head of claim 4, wherein each of the first and the second electrical components comprises a resistive heater.

6. The recording head of claim 5, wherein one of the resistive heaters is positioned proximate to a writing element, and the other one of the resistive heaters is positioned proximate to a reading element.

7. A data storage system comprising:
   a head heater circuit comprising:
      a first electrical path having a first diode connected in series to a first electrical heating component; and
      a second electrical path having a second diode connected in series to a second electrical heating component, the first and the second diodes being biased in opposite directions, and the first and the second electrical paths being electrically connected in parallel.

8. The data storage system of claim 7, and further comprising:
   a first electrical connection point that is connected to a first node of the first and the second electrical paths; and
   a second electrical connection point that is connected to a second node of the first and the second electrical paths.

9. The data storage system of claim 8, and further comprising:
   a power supply component that is electrically connected to the first and the second electrical connection points.

10. The data storage system of claim 9, wherein the power supply component comprises a balanced power supply component.

11. The data storage system of claim 9, wherein the power supply component comprises an unbalanced power supply component.

12. The data storage system of claim 9, wherein the power supply component comprises a floating power supply component.

13. A data storage system comprising:
    a recording head comprising:
       first and second pads that enable one or more devices, which are external to the recording head, to be electrically connected to the recording head;
       a dual heater circuit including first and second electrical heating elements connected in parallel,
       wherein the dual heater circuit is configured to receive electrical power via only the first pad and the second pad.

14. The data storage system of claim 13 further comprising:
    a first diode connected in series with the first electrical heating element; and
    a second diode connected in series with the second electrical heating element.

15. The data storage system of claim 14, and further comprising:
    a power supply that is connected to the first and the second pads.

16. The data storage system of claim 15, wherein the power supply is configured to apply a balanced voltage to the first and the second pads.

17. The data storage system of claim 15, wherein the power supply is configured to apply an unbalanced voltage to the first and the second pads.

18. The data storage system of claim 15, wherein the power supply is configured to apply a floating voltage to the first and the second pads.

19. The data storage system of claim 14, wherein the first and the second diodes are biased in opposite directions.

20. The data storage system of claim 14, and further comprising:
   third and fourth diodes that are connected to the first and the second electrical heating elements.

21. The data storage system of claim 20, wherein the third and the fourth diodes are biased in opposite directions.

* * * * *